United States Patent
Siavoshani et al.

(10) Patent No.: US 7,842,146 B2
(45) Date of Patent: Nov. 30, 2010

(54) ULTRASONIC ENERGY FOR ADHESIVE BONDING

(75) Inventors: Saeed J. Siavoshani, Bloomfield, MI (US); Syed Z. Mahdi, Rochester Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 352 days.

(21) Appl. No.: 11/961,114

(22) Filed: Dec. 20, 2007

(65) Prior Publication Data

US 2008/0178986 A1    Jul. 31, 2008

Related U.S. Application Data

(60) Provisional application No. 60/886,786, filed on Jan. 26, 2007.

(51) Int. Cl.
*B32B 37/00* (2006.01)

(52) U.S. Cl. ...................... 156/73.1; 156/330

(58) Field of Classification Search ............ 156/71, 156/73.1, 325, 326, 327, 330, 574, 580.1, 156/580.2
See application file for complete search history.

(56) References Cited

U.S. PATENT DOCUMENTS

| | | | |
|---|---|---|---|
| 3,317,433 A | 5/1967 | Herman | |
| 4,091,130 A | 5/1978 | Shaw | |
| 4,100,148 A | 7/1978 | Hockenberger et al. | |
| 4,373,082 A | 2/1983 | Kimball et al. | |
| 4,390,645 A | 6/1983 | Hoffman et al. | |
| 4,400,497 A | 8/1983 | Blum et al. | |
| 4,461,854 A | 7/1984 | Smith et al. | |
| 4,483,974 A | 11/1984 | Groegler et al. | |
| 4,503,161 A | 3/1985 | Korbel et al. | |
| 4,507,469 A | 3/1985 | Mita et al. | |
| 4,528,354 A | 7/1985 | McDougal | |
| 4,604,444 A | 8/1986 | Donnadieu et al. | |
| 4,667,008 A | 5/1987 | Groegler et al. | |
| 4,758,648 A | 7/1988 | Rizik et al. | |
| 4,766,176 A | 8/1988 | Lee et al. | |
| 4,778,845 A | 10/1988 | Tschan et al. | |
| 4,780,520 A | 10/1988 | Rizik et al. | |
| 4,788,254 A | 11/1988 | Kawakubo et al. | |
| 4,837,401 A | 6/1989 | Hirose et al. | |

(Continued)

FOREIGN PATENT DOCUMENTS

CA    2 113 961 A1    10/1994

(Continued)

OTHER PUBLICATIONS

International Search Report and Written Opinion for corresponding PCT, Application No. PCT/US2007/088584, dated Dec. 21, 2007.

(Continued)

*Primary Examiner*—James Sells
(74) *Attorney, Agent, or Firm*—Dobrusin & Thennisch PC (57) ABSTRACT

An adhesive is contacted with a surface of a substrate and ultrasonic energy is applied to the adhesive to enhance the bonding of the adhesive to the surface of the substrate. The ultrasonic energy, particularly ultrasonic vibrations, can assist the adhesive in wetting the substrate surface, curing, polymerization or the like to enhance bonding.

18 Claims, 2 Drawing Sheets

U.S. PATENT DOCUMENTS

| | | |
|---|---|---|
| 4,950,715 A | 8/1990 | Duck et al. |
| 4,954,472 A | 9/1990 | Scott et al. |
| 4,990,392 A | 2/1991 | Groshens et al. |
| 5,102,969 A | 4/1992 | Schleffler et al. |
| 5,120,349 A | 6/1992 | Stewart et al. |
| 5,129,180 A | 7/1992 | Stewart |
| 5,194,460 A | 3/1993 | Evans et al. |
| 5,194,488 A | 3/1993 | Piestert et al. |
| 5,539,045 A | 7/1996 | Potts et al. |
| 5,601,761 A | 2/1997 | Hoffman et al. |
| 5,603,798 A | 2/1997 | Bhat |
| 6,054,001 A | 4/2000 | Swanson et al. |
| 6,224,793 B1 | 5/2001 | Hoffman et al. |
| 6,355,127 B1* | 3/2002 | Mahdi et al. ............... 156/155 |
| 6,613,816 B2* | 9/2003 | Mahdi et al. ............... 523/202 |
| 2002/0010272 A1* | 1/2002 | Mahdi et al. ............... 525/100 |
| 2006/0225842 A1* | 10/2006 | Darcy et al. ............... 156/580.1 |

FOREIGN PATENT DOCUMENTS

| | | |
|---|---|---|
| DE | 269 626 A1 | 7/1989 |
| DE | 41 116 54 A1 | 10/1992 |
| EP | 1 462 497 A | 9/2004 |
| JP | 06 252554 A | 9/1994 |
| WO | 94 182 55 A1 | 8/1994 |
| WO | 96 276 41 A1 | 9/1996 |
| WO | 98 111 66 A1 | 3/1998 |

OTHER PUBLICATIONS

Preliminary Report for corresponding PCT, Application No. PCT/US2007/088584, dated Dec. 21, 2007.

* cited by examiner

ULTRASONIC ENERGY FOR ADHESIVE BONDING

CLAIM OF BENEFIT OF FILING DATE

The present application claims the benefit of the filing date of U.S. Provisional Application Ser. No. 60/886,786, filed Jan. 26, 2007, hereby incorporated by reference.

TECHNICAL FIELD

The present invention relates to the use of ultrasonic energy for assisting in adhesive bonding. More particularly, the present invention relates to the application of ultrasonic vibration to a member for assisting in bonding an adhesive to one or more surfaces.

BACKGROUND OF THE INVENTION

Adhesive bonding is employed in numerous applications. For example, surfaces of members of articles of manufacture such as automotive vehicles (e.g., cars, busses etc.) and aerospace vehicles (e.g., airplanes) are often adhesively bonded together in the assembly and manufacture of those vehicles. Moreover, surfaces of various different materials such as metal, glass, polymeric materials or the like are adhesively bonded to each other in the assembly and manufacture of vehicles such as those just mentioned or in the assembly and manufacture of various other articles. Examples of adhesive bonding are disclosed in U.S. Pat. Nos. 7,128,373; 6,997,515; 6,984,287; 6,739,673; 6,739,302; 6,688,700; 6,543,404; 6,491,346, all of which are incorporated herein by reference for all purposes.

While adhesive bonding has been employed for many years, current techniques of adhesive bonding still present many drawbacks. As one example, curing times for many adhesive may be undesirably slow. As another example, the desired timing for curing of an adhesive during the assembly or manufacture of an article of manufacture may not coincide with the desired timing for application of the adhesive. As yet another example, the ability of an adhesive to securely bond to a surface can be limited. As still another example, conventional sources of heat and or energy needed for curing adhesives can be undesirable and/or inconvenient in a variety of manufacturing environments.

Accordingly, there is a need in the industry for methods and techniques, which overcome one or more of the aforementioned drawbacks of adhesive bonding or other drawbacks as will become apparent for the description of the invention.

SUMMARY OF THE INVENTION

There is disclosed a method of bonding an adhesive to a surface of an article of manufacture during formation of the article. According to the method the adhesive is contacted with, during the formation of the article of manufacture, a surface of a first substrate. The adhesive is a latent adhesive that is curable by exposure to heat. The adhesive includes at least one of an epoxy a, a polyurethane, a polyurea, a polyester, a vinyl ester or a phenolic. The article of manufacture can be selected from furniture, a transportation vehicle, a household appliance, a toy or an electronic device. For bonding the adhesive to the surface of the first substrate, ultrasonic energy is applied to the adhesive. Typically, such energy is applied without the use of added heat to an environment surrounding the adhesive.

DETAILED DESCRIPTION OF THE PREFERRED EMBODIMENT

The present invention is predicated upon the use of ultrasonic energy (e.g., ultrasonic vibration) for assisting in bonding an adhesive to at least one surface of a member or structure. Accordingly, there is provided a method that includes a combination of two or more of the following steps:

1) contacting an adhesive with a surface of a first substrate;
2) contacting the adhesive with a surface of a second substrate;
3) applying ultrasonic energy to the adhesive to assist the adhesive in bonding to the surface of the first substrate, the surface of the second substrate or both.

The method has been found to be particularly desirable for assisting in providing adhesive bonding in multiple different circumstances. As one example, the method can be employed for assisting in providing adhesive bonding in relatively short periods of time. As an additional or alternative example, the method can assist in providing a greater degree of adhesive bonding in situations where that degree of bonding might not otherwise be achieved until a later point in time or at all.

It is contemplated that multiple different ultrasonic energy providers may be used to provide ultrasonic energy to the adhesive. A typical ultrasonic energy provider will be configured to provide ultrasonic vibration and will include two or more of an energy source (e.g., a power supply or power generator), one or more energy processors (e.g., a converter, a booster or both) and an energy transmitter (e.g., a horn). Generally, the energy source will provide energy that is processed, if needed, by the one or more energy processors and that energy is provided to and transmitted from the transmitter to an adhesive as is further described below. Processing of the energy can include converting the energy to a desired form for transmission (e.g., from electrical energy to ultrasonic energy such as ultrasonic vibrations), increasing or decreasing the energy to the transmitter, changing the nature of the energy to the transmitter or the like.

Figure 1:
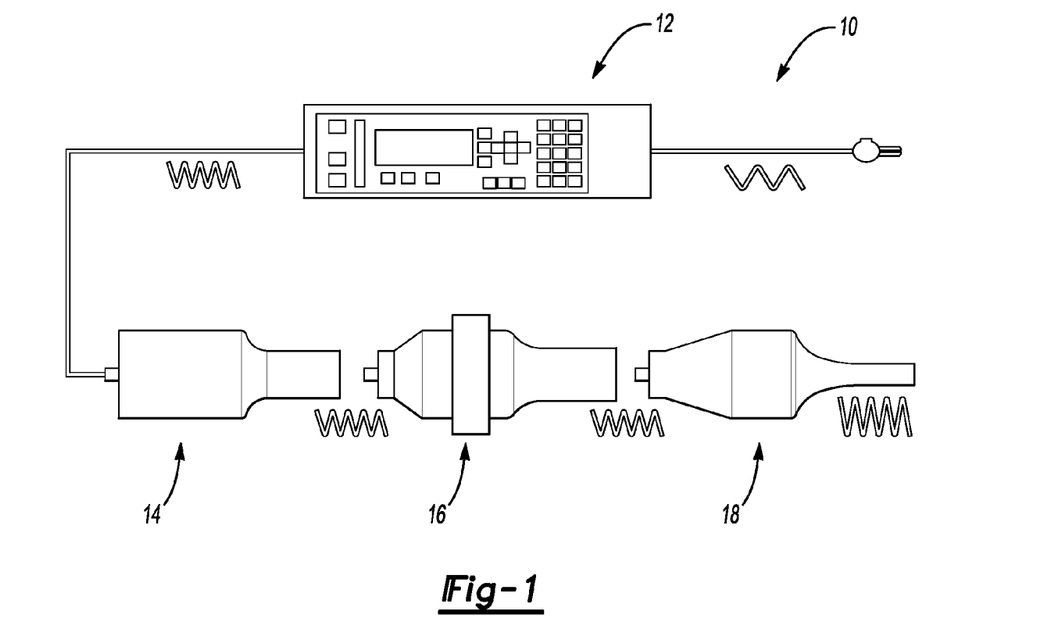
FIG. 1 illustrates an exemplary ultrasonic energy provider according to an aspect of the present invention.

With reference to FIG. 1, there is illustrated an exemplary ultrasonic energy provider 10. As shown, the provider 10 includes an energy or power source 12, a first energy processor 14 shown as a converter, a second energy processor 16 shown as a booster, and a transmitter 18 shown as a horn. In the particular embodiment illustrated, the energy source 12 provides electrical energy (e.g., a voltage) to the first energy processor 14, which uses at least one, but preferably multiple piezoelectric elements to convert the electrical energy to mechanical energy in the form of ultrasonic vibrations. The energy (e.g., vibrations) is then provided to the second energy processor 16, which increases or decreases the amplitude of the vibrations thereby increasing or decreasing the amount of energy transmitted to the transmitter 18 in the form of ultrasonic vibrations. The transmitter 18 then provides the ultrasonic energy (e.g., vibrations) to the adhesive as is described further below.

One exemplary ultrasonic energy providers suitable for use in the present invention is a 2000 Series High Power provider commercially available from Branson Ultrasonics corporation, 41 Eagle Rd., Danbury Conn., 06813. The providers can typically provided vibrations or ultrasonic energy at a frequency of between about 10 KHz to about 50 KHz, although high or lower frequencies may used unless otherwise specified. Exemplary frequencies include, without limitation, 10 KHz, 20 KHz and 40 KHz. It is also contemplated that different levels of ultrasonic energy could be applied progressively to an adhesive to achieve desired curing results.

Multiple different adhesives may be employed in the present invention, although particular adhesives are preferred. It is generally preferable that the adhesive is compatible with (i.e., capable of adhering to) the material of the surface[s] of the substrate[s] (e.g., members, structures or the like) to which the adhesive is contacted. If, however, the adhesive is slightly or more substantially incompatible with one of these materials, it may be desirable to treat the surface[s] formed of the incompatible material. Exemplary treatments include the application of primer, exposure to plasma, combinations thereof or the like. The adhesive used can be thermosettable, polymerizable or both and can be a two component adhesive, a cure on demand adhesive (e.g., a latent adhesive) or otherwise.

The adhesive can be a urethane based adhesive, and more preferably a urethane adhesive. Alternatively, the adhesive may include a functional component selected from acrylonitrile butadiene styrene (ABS), polycarbonate (PC), or a mixture thereof (e.g. PC-ABS). The adhesive can additionally or alternatively be a silane adhesive, a silicone adhesive or a mixture thereof. An acrylic adhesive may be additionally or alternatively be employed. The adhesive may also include an epoxy or be epoxy based. It may include polyolefinics, styrenics, acrylics or mixtures thereof. In one embodiment, a preferred adhesive includes alkyl borane. Examples of suitable adhesives are disclosed in commonly owned U.S. patent Ser. No. 09/466,321 (filed Dec. 17, 1999) and patent publication numbers 20020058764 and 20030001410 expressly incorporated herein by reference for all purposes. Any such adhesive may include suitable performance modifiers including art disclosed tackifiers, elastomers, impact modifiers, or the like. Potentially suitable adhesives are also disclosed in U.S. Pat. Nos. 6,709,539; 6,613,816; 6,127,032; 5,194,550, all of which are incorporated herein by reference for all purposes.

In one embodiment, a two part, organoborane/amine complex adhesive or other adhesive is employed for adhesively securing the structures together. Advantageously, such an adhesive can adhere to low surface energy surfaces or substrates. As such, the adhesive is preferably capable of bonding to corresponding surfaces having a surface energy of less than 45 mJ/m$^2$.

Adhesives, polymerizable compositions and method of use disclosed in International Patent Application No. PCT/US00/33806, incorporated herein by reference, are especially preferred for use in the present invention to bond the structures.

In general, the adhesive should exhibit bonding that is at least partly due to transmission of ultrasonic energy (e.g., vibrations) to the adhesive. Thus, the adhesive will exhibit an initial amount of bonding, an elevated or enhanced degree of bonding, substantially complete bonding, a combination thereof or the like upon exposure to and due to the ultrasonic energy. Such bonding is preferably relative to the amount of bonding the same adhesive would exhibit without exposure to the ultrasonic energy.

Cure on demand adhesives such as thermosettable and/or latent adhesives are particularly desirable adhesives that exhibit bonding upon exposure to ultrasonic energy. Latent adhesives typically exhibit bonding characteristics upon curing and/or thermosetting. As used herein, a latent adhesive is generally an adhesive that undergoes substantially no curing and/or thermosetting (i.e., less that 5% curing and/or thermosetting) below a first temperature but undergoes substantially full curing and/or thermosetting (i.e., greater than 70%, 80%, 90% or more curing and/or thermosetting) above a second temperature, the second temperature being higher than the first temperature. The first temperature is typically less than about 80° C., more typically less than about 55° C. and even more typically less than about 30° C., although higher or lower temperature may be possible. The second temperature is typically about greater than about 65° C., more typically greater than about 100° C. and even more possibly greater than about 180° C., although higher or lower temperature may be possible. Latent cure adhesive often use energy to initiate or trigger a polymerization reaction, a cross-linking reaction, a combination thereof or the like for developing adhesive bond strength. Such latent adhesives can be epoxy type adhesives (e.g., epoxy polymers or material that are latent cured or thermoset by an amine). Such latent adhesives can also be polyurethane or polyurea type adhesives (e.g., isocyanate reactive compounds such as polyols that are latent cured or thermoset by an isocyanate). Other additional or alternative adhesive can include or be based upon polyester, vinyl ester, phenolics, combinations thereof or the like. Other potential adhesives are of the type that include a heat curable silyl terminated polymer.

Two component adhesives can also be used according to the present invention. As used herein, a two component adhesive is an adhesive that reacts to cure and/or thermoset upon mixing of a first or polymer component with a second or curative component and typically substantially reacts (experiences at least 80%, 90% or more curing or thermosetting) at a temperature of about 23° C. As examples, the first component could include an epoxy polymer with the second component including an amine. As another example, the first component could include an isocyanate reactive compound and the second component include an isocyanate.

Whether latent, two component or otherwise, the adhesive can be a cure-on-demand adhesive which requires a separate operation to cause the adhesive to begin to cure. In one embodiment this is achieved by using an encapsulated curing agent which is ruptured during assembly or through exposure to heat. In another embodiment this is achieved by removing a protective coating to expose the adhesive to ambient conditions. Curing can also be initiated by exposing the adhesive to heat, infrared or ultraviolet light sources, or to shearing forces and the like.

While other adhesive families are contemplated as well (e.g., urethanes, acrylics, silanes, or the like), preferably the adhesive is a high temperature epoxy resin, a polyimide, a hybrid polyimide/epoxy resin adhesive or an epoxy novolac/nitrile rubber adhesive. Preferred adhesives are the high temperature epoxy resin adhesives. High temperature epoxy resin adhesive means an adhesive wherein the primary component is an epoxy resin which when cured can withstand exposure to the temperatures mentioned above without decomposing or delaminating from the substrate.

The adhesive is typically contacted with a surface of at least one substrate and, more typically is contacted with a surface of a first substrate and a surface of a second substrate and ultrasonic energy is provided to the adhesive thereby assisting in bonding the adhesive to the surface[s]. The ultrasonic energy may be transmitted directly to the adhesive, but is more typically transmitted from the at least one substrate to the adhesive. In such an embodiment, an ultrasonic energy provider and, more typically, a transmitter of the ultrasonic energy provider is contacted with the substrate to transmit the ultrasonic energy to the substrate, which, in turn, transmits the ultrasonic energy to the adhesive to assist the adhesive in bonding to the substrate[s].

Figure 2:
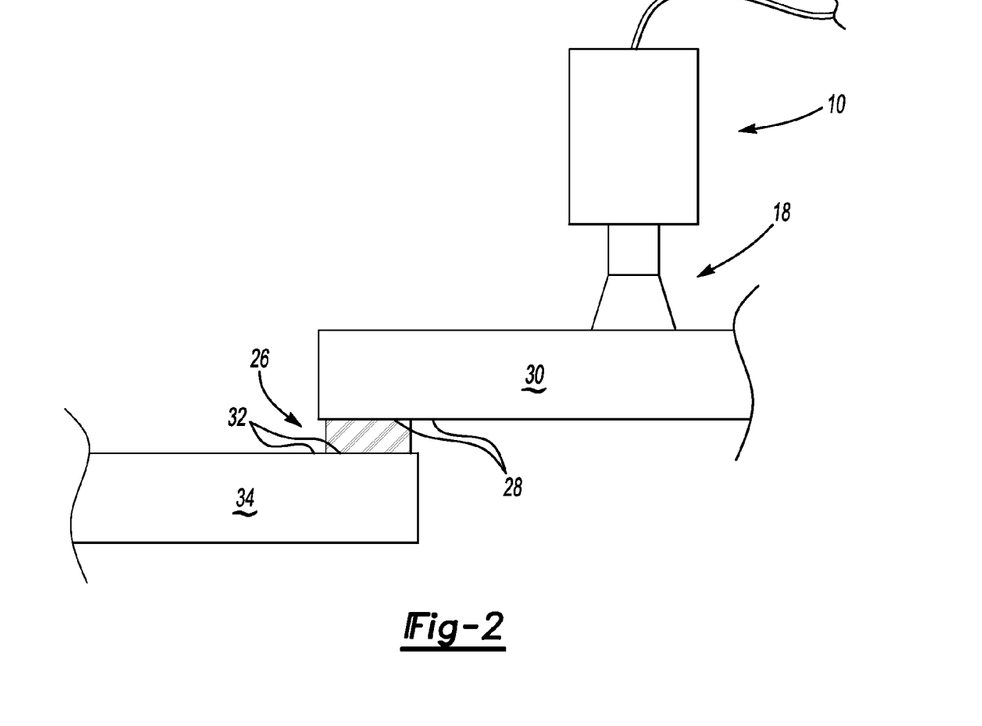
FIG. 2 is a side view of an exemplary adhesion technique according to an aspect of the present invention.

With reference to FIG. 2, an adhesive 26 according to the present invention is contacted with a surface 28 of a first substrate 30 and a surface 32 of a second substrate 34. Before, after or at the same time of such contacting, the ultrasonic provider 10 of FIG. 1, and particularly the transmitter 18 of the provider is contacted with the first substrate 30 and transmits ultrasonic vibrations to the substrate 30 and the substrate 30 transmits the ultrasonic vibrations to the adhesive 26 thereby assisting in bonding the adhesive 26 to the surfaces 28, 32.

The surfaces to be bonded can be flat or planar as shown in FIG. 2. The surfaces may also be contoured as well. For example, any suitable coacting surfaces for defining a joint may be employed, such as a friction fit, an interference fit or some other interlock fit, may be used. Examples of suitable joints include butt joints, lap joints, tongue in groove joints, scarf joints, combinations thereof, or the like.

Figure 3A:
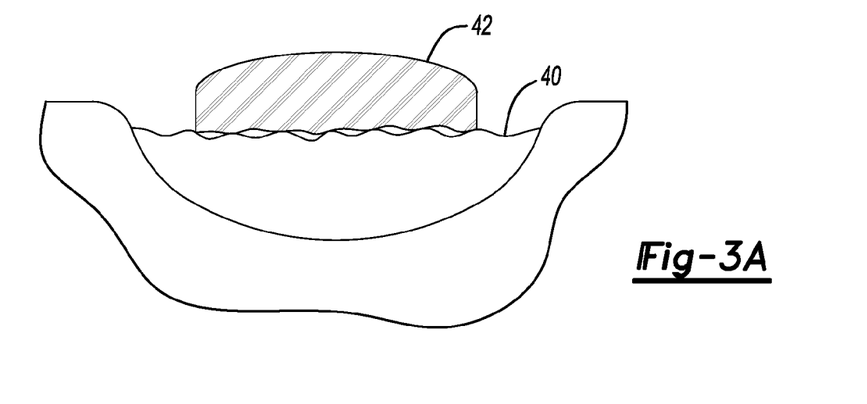
FIGS. 3A and 3B illustrate an adhesive applied to a surface according to an exemplary aspect of the present invention.
Figure 3B:
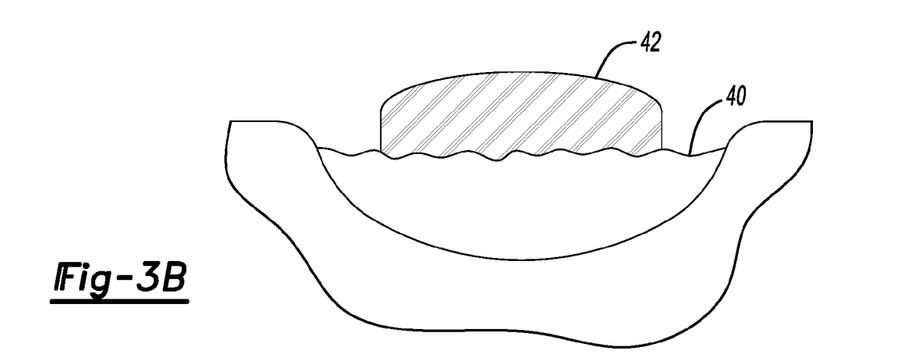

The ultrasonic energy can assist bonding according to one or more mechanisms. Generally, it is believed, without unnecessarily being bound by any particular theory, that the ultrasonic energy can assist the adhesive in wetting the surface of any substrate to which the adhesive has been contacted. For illustrative purposes, reference is made to FIGS. 3A and 3B. FIG. 3A shows a magnified surface 40 after contacting of the surface 40 with an adhesive 42 but prior to application of ultrasonic energy and FIG. 3B shows the surface 40 after application of the ultrasonic energy. As can be seen, the ultrasonic energy and particularly ultrasonic vibrations can assist the adhesive 42 in contacting a greater amount of the surface area of the surface 40 thereby enhancing bonding to the surface 40. Such greater contacting can be the result of movement of the surface and/or adhesive caused by the ultrasonic energy and/or heating of the adhesive by the ultrasonic energy which can make the adhesive more flowable. This type of bonding enhancement can be employed for a wide variety of adhesives as disclosed herein or otherwise known and is particularly effective for liquid and or semi-solid adhesives, although it may be used for initially solid adhesive as well.

Heating of the adhesive by ultrasonic energy (e.g., vibrations) can also assist the adhesive in bonding to surfaces of substrates in other instances as well. In particular, such heating can help with mechanisms such as curing, thermosetting, cross-linking and/or polymerization of adhesives and is therefore particularly helpful in assisting adhesives, which tend to bond through these mechanisms. It will be understood that adhesives that bond according to each of these mechanisms have been disclosed herein. Advantageously, in some embodiments of the present invention, ultrasonic energy can be used to partially or fully cure an adhesive while the temperature of the environment surrounding the adhesive (i.e., the temperature of air 1 cm away from the adhesive) can remain below 80° C., more typically below 50° C. and even more typically below 35° C. In such embodiments, the adhesive can be heated for such cure by ultrasonic energy without the use of added heat to the environment surrounding the adhesive such as by an oven.

Such adhesive heating through ultrasonic energy has been found particularly effective for cure on demand adhesives and even more particularly for latent curing adhesives disclosed herein. It will be understood that such heating can be used for any of the cure on demand adhesives or latent curing adhesives disclosed herein or otherwise known.

As one example of a cure on demand or latent curing system, the adhesive can be composed of a base or polymeric material (e.g., an epoxy material or isocyanate reactive material) that has catalyst, curing agent or other reactive compound contained within encapsulations (e.g., thermoplastic shells), which are dispersed throughout the base or polymeric material. Upon exposure to ultrasonic energy, the encapsulations typically fail (e.g., melt or rupture) to allow the reactive compound in the encapsulation to react with the base or polymeric material thereby curing, polymerizing, cross-linking, thermosetting or a combination thereof the base or polymeric material. Such adhesives can typically be at least partially cured or more substantially cured by elevating the temperature of the adhesive to between about 40° C. and about 140° C., more typically between about 50° C. and about 100° C. and more typically between about 60° C. and about 80° C. using ultrasonic energy alone or in conjunction with other heat although other temperatures may be used as well depending upon the encapsulation used. Other examples of these adhesives include polyol prepolymer with encapsulated isocyanate adhesive sold under the tradename BETAFORCE and commercially available from The Dow Chemical Company, Midland, Mich. Such adhesives can typically be at least partially cured or more substantially cured by elevating the temperature of the adhesive to between about 50° C. and about 200° C., more typically between about 80° C. and about 160° C. and more typically between about 120° C. and about 140° C. using ultrasonic energy alone or in conjunction with other heat.

As one example of a cure on demand or latent curing system, the adhesive can be composed of a base or polymeric material (e.g., an epoxy resin or material or isocyanate reactive material) that has catalyst, curing agent or other reactive compound that cures, polymerizes, cross-links, thermosets or a combination thereof the base material when the adhesive reaches an elevated temperature. Examples of these adhesives include the BETAMATE series of adhesives, commercially available from The Dow Chemical Company, Midland, Mich. Such adhesives can typically be at least partially cured or more substantially cured by elevating the temperature of the adhesive to between about 120° C. and about 300° C., more typically between about 150° C. and about 250° C. and more typically between about 190° C. and about 210° C. using ultrasonic energy alone or in conjunction with other heat.

Advantageously, the application of ultrasonic energy to the adhesive can, depending upon the adhesive employed, result in relatively short cure times for the adhesive. In particular, it has been found that an adhesive, or at least a portion of the adhesive, such as a latent cured adhesive can experience a substantial amount of cure (e.g., at least 30% cure, at least 60% cure, at least 90% cure or more) in a relatively short period time (e.g., less than 10 minutes, less than 2 minutes, less than 1 minute or below). Moreover, when an adhesive experience a substantial amount of cure is such a time period, it can often exhibit tensile strengths of at least about 250 psi, more typically at least about 300 psi, and possibly at least about 800 psi or at least about 1000 psi when such strengths are measure according to SAE 1529.

It is noted that it can be advantageous to apply the ultrasonic energy intermittently and/or repeatedly, for example, by applying the energy for a period of time followed by stopping the application of energy repeatedly. In this manner, it may be possible to provide greater heat to the adhesive while providing less heat to the substrates when compared with a continuous application of ultrasonic energy. It is also contemplated that the present invention can be used to spot cure or spot bond adhesives at one or multiple locations that are part of an overall adhesive bond or strip of adhesive for providing enough adhesion for an initial bonding until the entirety of the adhesive later more fully cures and bonds.

The adhesion techniques of the present invention can be employed to assist in bonding an adhesive to a variety of different surface of substrates, which can be formed of a variety of materials. For examples, the substrates and/or the surfaces or the substrates to be bonded can be formed of glass, metal (e.g., steel, aluminum or both), polymeric materials (e.g., plastic, elastomers, thermoplastics, thermosets, combinations thereof or the like), fibrous materials (e.g., woods, fabrics or the like). Moreover, the techniques can be used to bond an adhesive to similar surfaces (i.e., surfaces made of similar or same materials) or dissimilar surfaces (i.e., surfaces made of dissimilar materials). Thus, the techniques can be used to bond an adhesive to a surface of polymeric material to another surface of polymeric material, a surface of metal to another surface of metal, a surface of glass to another surface of glass or the like. Alternatively, the techniques can be used to bond an adhesive to a surface of polymeric material and a surface of glass, a surface of glass and a surface of metal, a surface of polymeric material to a surface of metal or the like. In each instance, it is generally preferable that the adhesive be formed of a different material than the one, two or more surfaces to which the adhesive is bonding.

It is additionally contemplated that the surfaces to which the adhesive is being bonded can be coated surfaces. Examples include metal, glass or polymeric surface coated by primer, paint, electro-coat, combinations thereof or other coatings. Thus, as used herein, bonding a surface formed of first material to a surface formed of the same or different material includes bonding directly to that surface or bonding to that surface as coated, unless otherwise stated.

As suggested, surfaces of polymeric materials can include a thermoset material, a thermoplastic material, or a mixture thereof. Among preferred high-performance thermoplastic materials are polybutylene terephthalate, polyetherimides, polyphenylene ether/polyamide resins, polyether sulfone resins, polyether ether ketone resins, liquid crystal polymers, polyarylsulfone resins, polyamideimide resins, polyphthalimide resins, nylon 6,6, polyamide resins, syndiotactic polystyrene, and blends thereof. In a particular preferred embodiment, the material is a thermoplastic selected from polyamides, polystyrenes, polyolefins, polycarbonates, or mixtures thereof. More preferably, the material is selected from polyamides (e.g., nylon 6,6), polystyrenes or mixtures thereof. In one preferred embodiment, the material is a blend of polyamides and syndiotactic polystyrenes, and more preferably a blend of nylon 6,6 and syndiotactic polystyrene. Among useful thermoset materials are polyurethanes, epoxy resins, molding compounds (e.g., bulk and sheet molding compounds) or the like.

Generally, it is contemplated that the ultrasonic energy provider can be located at or adjacent a location where an adhesive is being applied to (i.e., contacted with) one or more surfaces and that the energy provider can provide energy to the adhesive in a relatively short period of time after the adhesive has been contacted with the one or more surfaces. As used herein, a relatively short period of time as it refers to application of ultrasonic energy after application of adhesive is typically less than 10 hours, more typically less than 1.5 hours, even more typically less than 25 minutes and even possibly less than 10 or even 5 minutes. As used herein, the term at or adjacent as it applies to a location of adhesive application typically means within 1000 meters, more typically within 300 meters, more typically within 100 meters, still more typically within 40 meters, and even possible within 15 or even 8 meters. As an example, for automotive applications as discussed herein or otherwise, an ultrasonic energy provider can be provided within an automobile or automotive parts assembly plant and can be located at or adjacent a location such as an automotive assembly line where an adhesive is being applied.

An adhesive can be substantially entirely or entirely cured and/or bonded through application of ultrasonic energy according to the present invention. It is also contemplated, however, that ultrasonic energy may be employed to provide an initial or first degree of cure and/or bonding during a first period of time and the adhesive can be configured to undergo a second degree of cure and/or bonding during a second period of time that is distinct from the first period of time and is typically by a mechanism such as time or external heating that is different than the application of ultrasonic energy. In such circumstance, the first degree of curing and/or bonding typically results in less than 90%, more typically less than 70% and even possibly less than 40% of the overall curing and/or bonding experienced through the first degree and second degree of bonding as measured by the amounts of the portions of the overall adhesive that is cured and/or bonded or as measured by the amount of curing and/or bonding experienced throughout the entire adhesive. In such an embodiment, the tensile strength of the adhesive exhibited after the first degree of curing and/or bonding will typically be at least 10% less, more typically at least 30% less and even more typically at least 50% less than the tensile strength exhibited by the adhesive after the second degree of bonding and/or curing, although such is not required unless otherwise specifically stated. Such tensile strength can be measure according to SAE 1529.

Substrates and surfaces of those substrates that can be adhered according to the present invention can be part of members or structures of furniture, transportation vehicles, household appliances, toys, electronic devices or other articles of manufacture. The present invention has been found particularly useful for automotive vehicles and members or structures of those vehicle which can include substrates and surfaces suitable for adhesion include, without limitation, body members, components of bumpers, components of a vehicle frame, component of a vehicle roof, components (e.g., panels) of vehicle bodies, windshields, backlites, interior components, instrument panel assemblies, seat back assemblies, lamp assemblies, water conductor assemblies, radiator end tank assemblies, glove boxy assemblies, center console assemblies, oil pan assemblies, engine intake manifold assemblies, air bag door assemblies, pillars (e.g., metal flanges of pillars), combinations thereof or the like. The present invention has also been found particularly useful in adhering a wire and harness bracket to a frame (e.g., a metal frame that is preferably steel), which may be for an automotive vehicle or other article of manufacture. Moreover, these structures and members may be adhered to each other according to the present invention, for example, frame components, pillar components, body components, roof components, combinations thereof or the like can be adhered and/or bonded to other frame components, body components, pillar components, combinations thereof or the like in attaching a roof module to the rest of a vehicle or in attaching other portions of vehicle together. Examples of these various structures, components and assemblies as well as adhesives being used in them are disclosed in U.S. Pat. Nos. 7,137,670; 7,128,373; 6,997,515; 6,988,757; 6,984,287; 6,860,010; 6,739,673;

6,739,302; 6,688,700; 6,613,389; 6,543,404; 6,491,346; and U.S. Patent Publication Nos: 20050082896; 20050040690; 20050005890; 20040238114; 20040231628; 20040194877; 20040160089; 20040155513; 20040041429; 20030214082; 20030159264; and 20030075968, all of which are hereby expressly incorporated by reference for all purposes and for specifically disclosing substrates and members that can be adhered to each other using the methodology and/or techniques of the present invention.

EXAMPLES

Figure 4:
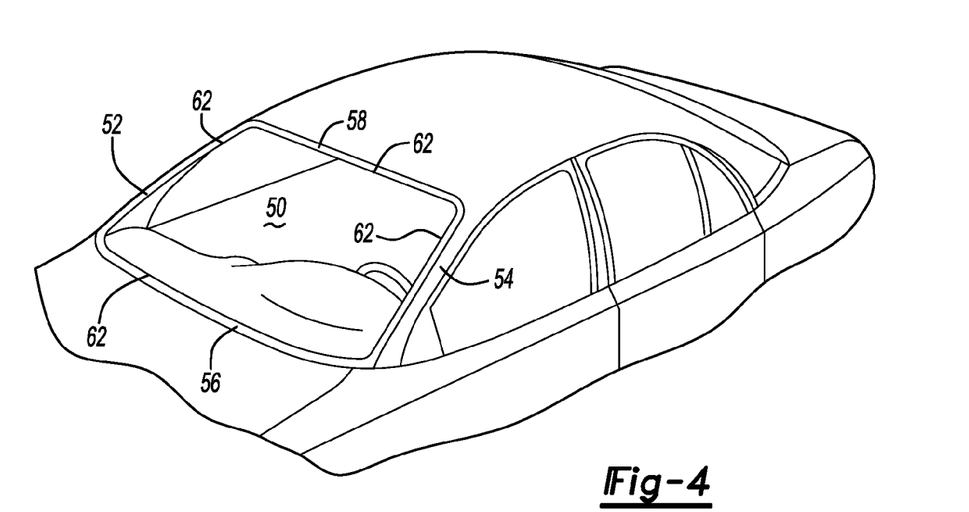
FIG. 4 is a perspective view of a vehicle having components adhered according to an exemplary aspect of the present invention.

As one example and referring to FIG. 4, ultrasonic energy can be used for assisting in adhering a glass panel 50 (e.g., a windshield or backlite) to one or more components 52, 54, 56, 58, of a vehicle such as pillars 52, 54, cowl or rear frame 56, roof 58 or others. In such an embodiment, an adhesive 62 is contacted with a surface (e.g., glass surface) of the glass panel 50 and a surface (e.g., metal surface) of one or more of the components 52, 54, 56, 58 and a transmitter of an ultrasonic provider is contacted with the glass panel 50 or one or more of the components 52, 54, 56, 58 to supply ultrasonic energy (e.g., vibration) to the adhesive to assist the adhesive in bonding to the panel 50 and/or the components 52, 54, 56, 58 according the invention as described above. According to this example, an adhesive such a polyurethane or other adhesive can be relatively quickly bonded to a first degree which is sufficient to allow further processing or manufacture of the vehicle and then a second degree of adhesion can be reached in a period of time thereafter by virtue of the adhesive curing due to exposure to moisture in the air or otherwise.

As another example, the bonding technique of the present invention can alleviate the need for temporary mechanical fasteners where such fasteners are typically used to at least temporarily hold structures together as an adhesive cures and/or bonds to surfaces of substrates of the structures. Thus, an adhesive (e.g., an epoxy structural adhesive) can be contacted with a surface of a first substrate that is part of a first structure of an article of manufacture (e.g., an automotive vehicle) and contacted with a surface of a second substrate that is part of a second structure of the article of manufacture and ultrasonic energy can be applied as described above to bond the adhesive to the surfaces in a relatively short period of time such that temporary fasteners are unneeded. This can be particularly useful for providing bonding when one or more of the surfaces or substrates are plastic. Such bonding can be provided in a first degree through ultrasonic energy and bonding to a second degree can be through another mechanism. Alternatively, curing by ultrasound energy can be substantially total curing.

As another example, the bonding technique of the present invention can alleviate the need for temporary fastening or attachment in instances where an adhesive (e.g., an epoxy structural adhesive) is designed to cure in an automotive e-coat or paint bake oven. Thus, the adhesive can be contacted with a surface of a first substrate that is part of a first structure of an automotive vehicle and contacted with a surface of a second substrate that is part of a second structure of the article of manufacture and ultrasonic energy can be applied as described above to bond the adhesive to the surfaces in a relatively short period of time such that temporary attachment or fastening is unneeded. This can provide a first degree of curing and/or bonding and a second degree of curing and/or bonding can be achieved in the e-coat or paint oven. Alternatively, curing by ultrasound energy can be substantially total curing.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of bonding an adhesive to a surface of an article of manufacture during formation of the article, the method comprising:
    contacting, during the formation of the article of manufacture, an adhesive with a surface of a first substrate, wherein:
        i. the adhesive is a latent adhesive and includes a plurality of encapsulations which are dispersed throughout the adhesive, wherein the plurality of encapsulations encapsulate a curing agent or other reactive compound;
        ii. the adhesive includes at least one of an epoxy, a polyurethane, a polyurea, a polyester, a vinyl ester, or a silyl terminated polymer type adhesive, or a phenolic; and
        iii. the article of manufacture is furniture, a transportation vehicle, a household appliance, a toy or an electronic device; and
    applying ultrasonic energy at a frequency of about 10 to about 50 KHz to the first substrate to assist in rupturing the plurality of the encapsulations, thus releasing the curing agent or other reactive compound and bonding the adhesive to the surface of the first substrate without the use of added heat to an environment surrounding the adhesive, wherein the ultrasonic energy is used to provide a first degree of bonding and the adhesive undergoes a second degree of bonding at a later time.

2. A method as in claim 1 further comprising contacting the adhesive with a surface of a second substrate wherein the application of ultrasonic energy to the adhesive assists in bonding the adhesive to the surface of the second substrate.

3. A method as in claim 2 wherein the first substrate is part of a structure of an automotive vehicle and the second structure is part of an automotive vehicle.

4. A method as in claim 1 wherein the adhesive is a heat and/or latent curable adhesive that is selected from an epoxy type adhesive, a polyurethane type adhesive, a polyurea type adhesive or a silyl terminated polymer type adhesive.

5. A method as in claim 1 wherein the ultrasonic energy is provided as ultrasonic vibrations.

6. A method as in claim 1 wherein the surface of the first substrate and the surface of the second substrate are contoured.

7. A method of bonding an adhesive to a surface of an article of manufacture during formation of the article, the method comprising:

contacting, during the formation of the article of manufacture, an adhesive with a surface of a first substrate, wherein:
- iv. the adhesive is a latent adhesive and includes a plurality of encapsulations which are dispersed throughout the adhesive, wherein the plurality of encapsulations encapsulate a curing agent or other reactive compound;
- v. the adhesive includes at least one of an epoxy, a polyurethane, a polyurea, a polyester, a vinyl ester or a phenolic; and
- vi. the article of manufacture is furniture, a transportation vehicle, a household appliance, a toy or an electronic device; and applying ultrasonic energy at a frequency of about 10 to about 50 KHz to the first substrate to assist in rupturing the plurality of the encapsulations, thus releasing the curing agent or other reactive compound and bonding the adhesive to the surface of the first substrate without the use of added heat to an environment surrounding the adhesive; wherein the ultrasonic energy is applied intermittently and repetitively.

8. A method as in claim 1 wherein the ultrasonic energy is employed to cure only one or more portions of the adhesive.

9. A method as in claim 1 further comprising:
contacting, also during the formation of the article of manufacture, the adhesive with a surface of a second substrate wherein
the article of manufacture is an automotive vehicle and the first substrate or the second substrate are members of the automotive vehicle.

10. A method as in claim 9 wherein the adhesive is selected from an epoxy type adhesive, a polyurethane type adhesive, a polyurea type adhesive or a silyl terminated polymer type adhesive.

11. A method as in claim 9 wherein the ultrasonic energy is provided as ultrasonic vibrations.

12. A method as in claim 9 wherein the surface of the first substrate and the surface of the second substrate are contoured.

13. A method as in claim 9 wherein the ultrasonic energy is used to provide a first degree of bonding and the adhesive undergoes a second degree of bonding at a later time.

14. A method as in claim 9 wherein the ultrasonic energy is applied intermittently and repetitively.

15. A method as in claim 9 wherein the ultrasonic energy is employed to cure only one or more portions of the adhesive.

16. A method of bonding an adhesive to a surface of an article of manufacture during formation of the article, the method comprising:
contacting, during the formation of the article of manufacture, an adhesive with a surface of a first substrate, wherein:
- vii. the adhesive is a latent adhesive and includes a plurality of encapsulations which are dispersed throughout the adhesive, wherein the plurality of encapsulations encapsulate a curing agent or other reactive compound;
- viii. the adhesive includes at least one of an epoxy, a polyurethane, a polyurea, a polyester, a vinyl ester or a phenolic; and
- ix. the article of manufacture is furniture, a transportation vehicle, a household appliance, a toy or an electronic device; and applying ultrasonic energy at a frequency of about 10 to about 50 KHz to the first substrate to assist in rupturing the plurality of the encapsulations, thus releasing the curing agent or other reactive compound and bonding the adhesive to the surface of the first substrate without the use of added heat to an environment surrounding the adhesive; wherein different levels of ultrasonic energy are applied progressively.

17. A method according to claim 1 wherein the ultrasonic energy is applied when the article of manufacture is in an environment of below 35° C.

18. A method according to claim 9 wherein different levels of ultrasonic energy are applied progressively.

* * * * *

UNITED STATES PATENT AND TRADEMARK OFFICE
CERTIFICATE OF CORRECTION

| | | |
|---|---|---|
| PATENT NO. | : 7,842,146 B2 | Page 1 of 1 |
| APPLICATION NO. | : 11/961114 | |
| DATED | : November 30, 2010 | |
| INVENTOR(S) | : Saeed J. Siavoshani et al. | |

It is certified that error appears in the above-identified patent and that said Letters Patent is hereby corrected as shown below:

In Col. 10, line 34
delete "or a silyl terminated polymer type adhesive,""

Signed and Sealed this
Eighteenth Day of January, 2011

David J. Kappos
*Director of the United States Patent and Trademark Office*